United States Patent [19]
Takenaka et al.

[11] Patent Number: 5,378,972
[45] Date of Patent: Jan. 3, 1995

[54] ACTUATOR DRIVING METHOD

[75] Inventors: Toru Takenaka; Masato Hirose, both of Saitama, Japan

[73] Assignee: Honda Giken Kogyo Kabushiki Kaisha, Tokyo, Japan

[21] Appl. No.: 56,347

[22] Filed: Apr. 30, 1993

[30] Foreign Application Priority Data

Apr. 30, 1992 [JP] Japan .................................. 4-137882

[51] Int. Cl.$^6$ ............................................ G05B 19/405
[52] U.S. Cl. .................................................. 318/568.22
[58] Field of Search ..................................... 318/568.22

[56] References Cited

U.S. PATENT DOCUMENTS

| | | | |
|---|---|---|---|
| 5,105,137 | 4/1992 | Iijima | 318/568.22 |
| 5,204,602 | 4/1993 | Iwashita | 318/568.22 X |
| 5,206,566 | 4/1993 | Yoshida et al. | 318/568.22 |
| 5,245,264 | 9/1993 | Helgren et al. | 318/568.22 |

OTHER PUBLICATIONS

English language Abstract of JP3-184782.

*Primary Examiner*—William M. Shoop, Jr.
*Assistant Examiner*—Karen Masih
*Attorney, Agent, or Firm*—Lyon & Lyon

[57] ABSTRACT

A method for driving an actuator for displacing a mechanism connected thereto to a target displacement and holding it there against static load, wherein the internal friction force is utilized for holding the displacement, thereby reducing the actuator load and energy consumption. Command value of the actuator is once directed above the target displacement with respect to the direction of gravity so as to cause the internal friction force to act in the direction opposite to the static load. For that purpose, the command value is varied by adding a bias or by changing a gain to be multiplied thereto.

12 Claims, 15 Drawing Sheets

ACTUATOR DRIVING METHOD

BACKGROUND OF THE INVENTION

1. Field of the Invention

This invention relates to a method of driving an actuator for displacing a mechanism connected thereto to a target displacement (position) and holding it there against a load, and more particularly to a method of driving such an actuator which controls the actuator output so as to utilize internal frictional force for holding the target position, thereby reducing the actuator load and energy consumption.

2. Description of the Prior Art

In the electromechanical field, various types of actuators are used for converting energy into movement of a load. In the control of this conversion, the friction in the actuator and the mechanism and the motion transmission system thereby has up to now been treated as a negative factor adversely affecting positioning accuracy and the like. This thinking is reflected, for example, in the frictional force compensation method described in Japanese Patent Publication No. 2(1990)-39,805.

When the mechanism with friction is positionally controlled and then held at a given position, the force balance established can be expressed by the equation below. (In this specification, the term "friction" is used to mean the phenomenon of kinematic energy being converted to heat by relative movement between mechanisms or members in a continuous system and the term "internal frictional force" is used to mean the force acting opposite to the direction of motion on the contacting surface of a mechanism or member moving relative to another mechanism or member. And the term "Displacement" is used to mean angle or distance.

$$\text{Actuator output} = \text{External load} + \text{Internal frictional force} \quad (Eq.1)$$

Assuming that the internal frictional force can assume an arbitrary value between a negative value $F1$ and a positive value $F2$, i.e. $F1 < $ Internal frictional force $< F2$, it holds from the equation that $$F1 < \text{Actuator output} - \text{External load} < F2 \quad (Eq.2)$$

which can be rewritten as $$F1 + \text{External load} < \text{Actuator output} < F2 + \text{External load} \quad (Eq.3)$$

In other words, the forces are balanced and the displacement is held insofar as the actuator output is within the range defined by Equation 3.

As shown in FIG. 21, in PD and other conventional types of positional control, the value of the actuator output is totally ignored insofar as the displacement is held by maintaining the force balance indicated by Equation 3. Therefore, assuming the amount of energy consumed by the actuator to be proportional to the square of the actuator output, the amount of energy consumed by the actuator during hold may, in the worst case, become the larger of the square of (external load + $F1$) and the square of (external load + $F2$). Although method of saving energy by discontinuing control has ben used and thus reducing the actuator output to zero during hold, it is clear from Equation 3 that this expedient can be used only when $$9F1 + \text{External load} < 0,$$

and $$F2 + \text{External load} > 0 \quad (Eq.4)$$

Reduction of actuator energy consumption is particularly important in autonomous mobile robots and the like.

SUMMARY OF THE INVENTION

The object of this invention is therefore to provide a method of driving an actuator which reduces actuator energy consumption during hold by positively using the internal frictional force to reduce actuator energy consumption during hold to the minimum required, or at least to avoid the aforesaid worst case.

For realizing this object, the present invention provides a method for driving an actuator having an internal friction to displace a mechanism to a target value and hold there against load, comprising determining an initial displacement command value, adding a value to the initial displacement command value to determine a second displacement command value and then driving the actuator by the second displacement command value in the direction opposite to the load and returning the second displacement command value to the initial displacement command value and driving the actuator by the initial displacement command value.

BRIEF DESCRIPTION OF THE DRAWINGS

The above and other objects and advantages of the invention will be more apparent from the following description and drawings, in which.

DETAILED DESCRIPTION OF THE PREFERRED EMBODIMENTS

Embodiments of the invention will now be explained based on a biped walking robot control system as an example of an actuator.

Figure 1:
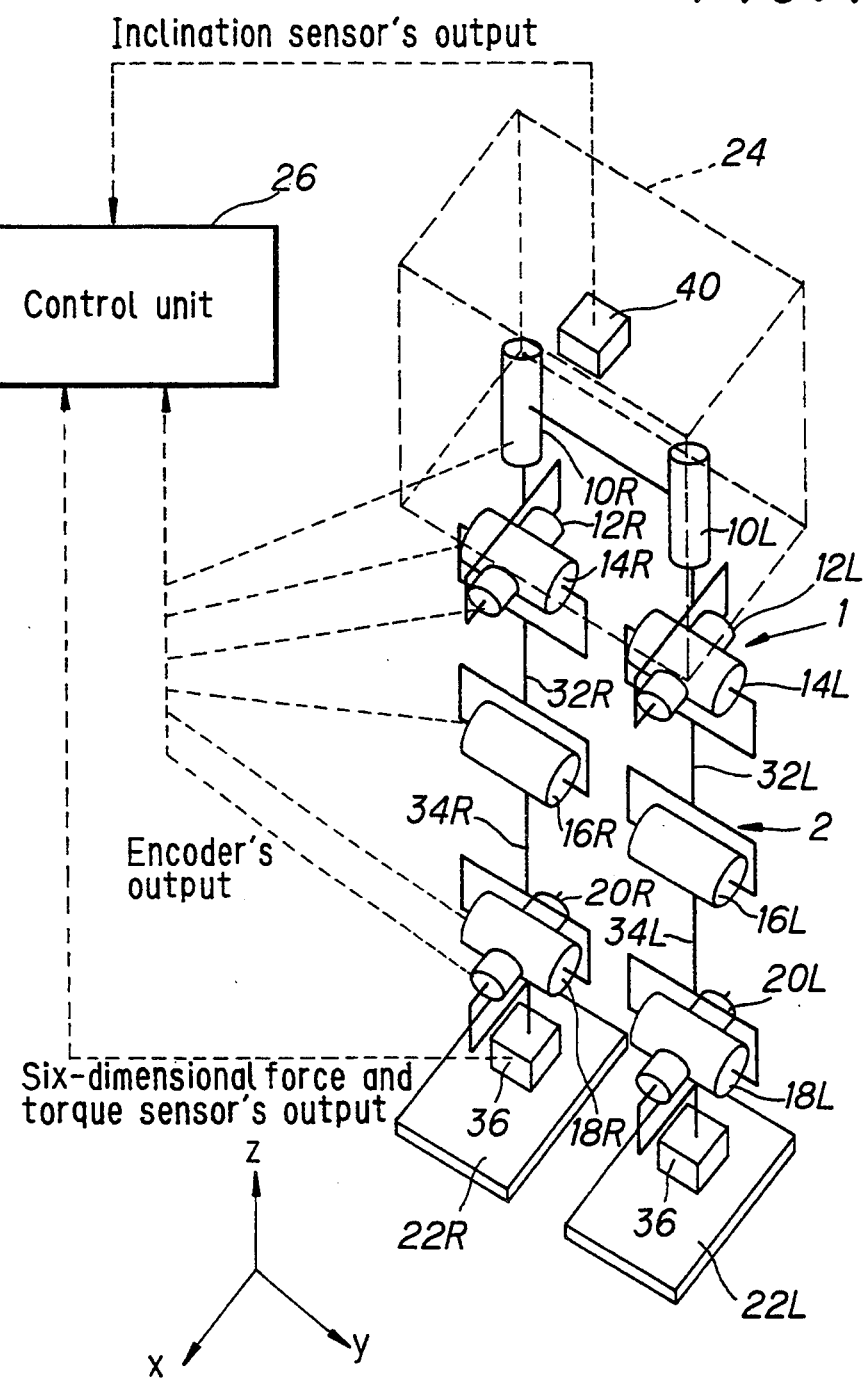
FIG. 1 is a schematic view showing the overall configuration of a legged mobile robot control system taking as an example of an actuator driving method according to the invention.

An overall skeleton view of a biped walking robot 1 is shown in FIG. 1. The robot 1 has left and right legs each having six Joints (axes). (To make the arrangement easier to understand, the joints (axes) are represented as the electric motors by which they are driven.) The six joints (axes) are, starting at the top, joints (axes) 10R, 10L for swiveling (generally horizontal rotation) of the legs at the hip (R and L indicating the right and left legs), joints (axes) 12R, 12L for rotation at the hip in the pitch direction (rotation about the x axis), joints (axes) 14R, 14L for rotation at the hip in the roll direction (rotation about the y axis), joints (axes) 16R, 16L for rotation at the knee in the roll direction, joints (axes) 18R, 18L for rotation at the ankle in the roll direction and joints (axes) 20R, 20L for rotation at the ankle in the pitch direction. Foot members 22, 22L are provided at the lower end of this arrangement and a body (main unit) 24 housing a control unit 26 is provided at the upper end. The hip joints in the foregoing configuration are constituted by the joints (axes) 10R(L), 12R(L) and 14R(L) and the ankle joints by the joints (axes) 18R(L) and 20R(L). The hip and knee joints are connected by thigh links 32R, 32L and the knee joints and ankle joints by crus links by 34R, 34L.

The leg links of the respective legs thus have six degrees of freedom, so that during locomotion the legs as a whole can be caused to execute the desired motion by driving the 6×2=12 joints (axes) to appropriate angle. The robot is thus capable of walking freely within three dimensional space. The joints are provided mainly by electric motors, as was mentioned earlier, and reduction gear mechanism for increasing motor torque. The structure of the joints is described in the assignee's earlier Japanese Patent Application No. 1(1989)-324,218 (Japanese Laid-Open Patent Publication No. 3(1991)-184,782) etc., and since it is not essential aspect of the present invention, will not be explained further here.

The individual ankles of the robot 1 shown in FIG. 1 are provided with a six dimensional force and torque sensor 36 of conventional design. By measuring the x, y and z force components Fx, Fy and Fz transmitted to the robot through the foot members and also measuring the moment components Mx, My and Mz around the three axes, the six-dimensional force and torque sensor 36 detects whether or not the associated foot member has landed and the magnitude and direction of the forces acting on the supporting leg. The sole of each foot member is equipped at its four corners with touchdown switches 38, not illustrated in FIG. 1, of conventional design for detecting whether or not the foot is in contact with the ground. The top of the body 24 is provided with an inclination sensor 40 for detecting the robot's inclination angle and angular velocity relative to z axis in the x-z and y-z planes. Each electric motor at the individual Joints is provided with a rotary encoder for generating rotational information. And, although not illustrated in FIG. 1, the robot 1 is provided with a zero reference switch 42 for calibrating the output of the inclination sensor 40 and a limit switch 44 for a fail safe. The outputs of the sensors 36 and the like are sent to the control unit 26 in the body.

Figure 2:
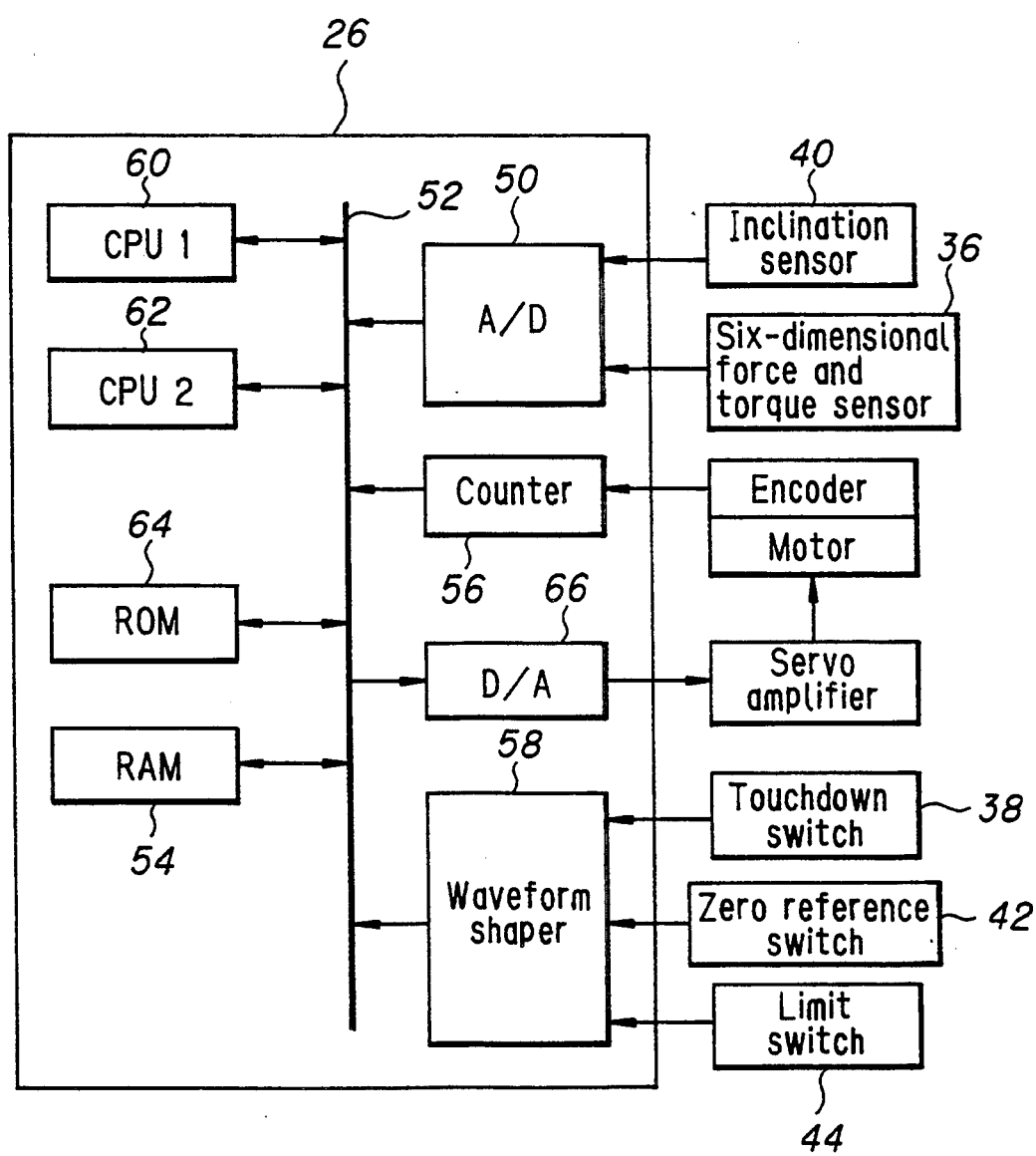
FIG. 2 is a block diagram illustrating the details of a control unit of the system of FIG. 1.
Figure 3:
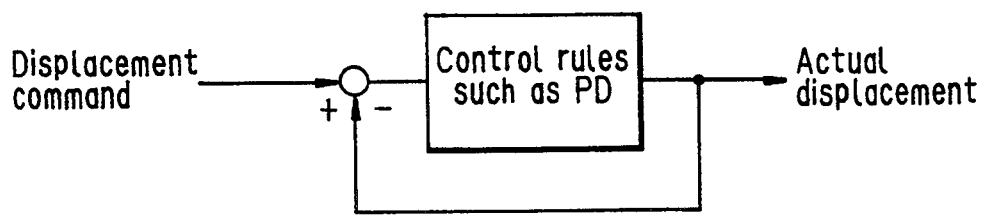
FIG. 3 is a block diagram showing a positional control in the operation conducted by the control unit of FIG. 2.

As shown in the block diagram of FIG. 2, the control unit 26 has a microcomputer. The outputs from the inclination sensor 40 etc. are converted into digital signals by an A/D converter 50 and the resulting digital values are sent via a bus 52 to a RAM (random access memory) 54 for storage. In addition, the outputs of encoders disposed adjacent to the respective motors are input to the RAM 54 through a counter 56, while outputs of the touchdown switches 38 are stored in the RAM 54 via a waveform shaper 58. The control unit has a first processor 60 and a second processor 62. The first processor 60 fetches a walking pattern defined in advance in terms of joint trajectories from a ROM (read-only memory) 64, computes target joint angles (joint drive pattern) and outputs the same to the RAM 54. The second processor 62 fetches the target joints angles (displacement commands) and measured joint angles from the RAM 54, computes control commands of the individual joint motors and sends the same to a servo amplifier thereof via a D/A converter 66 as illustrated in FIG. 3.

Figure 4:
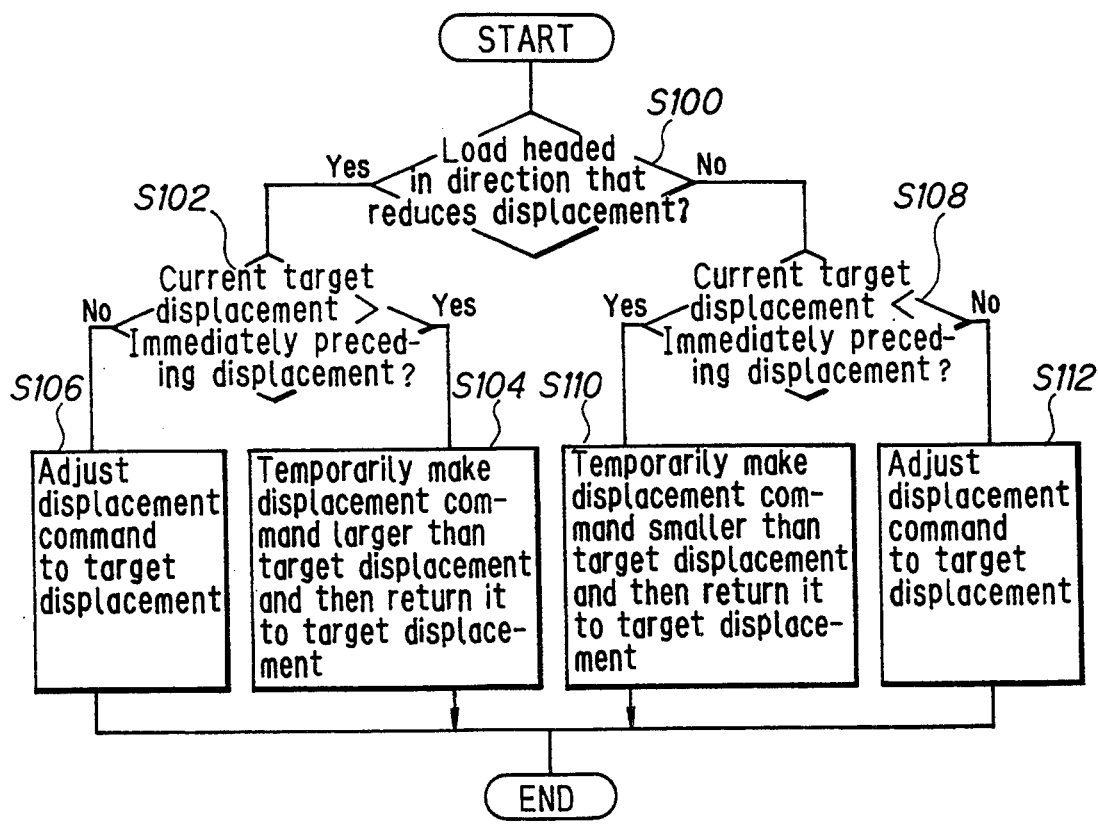
FIG. 4 is a flow chart showing a first embodiment of the actuator driving method according to the invention.

This will be explained with reference to the flow chart of FIG. 4.

Figure 5:
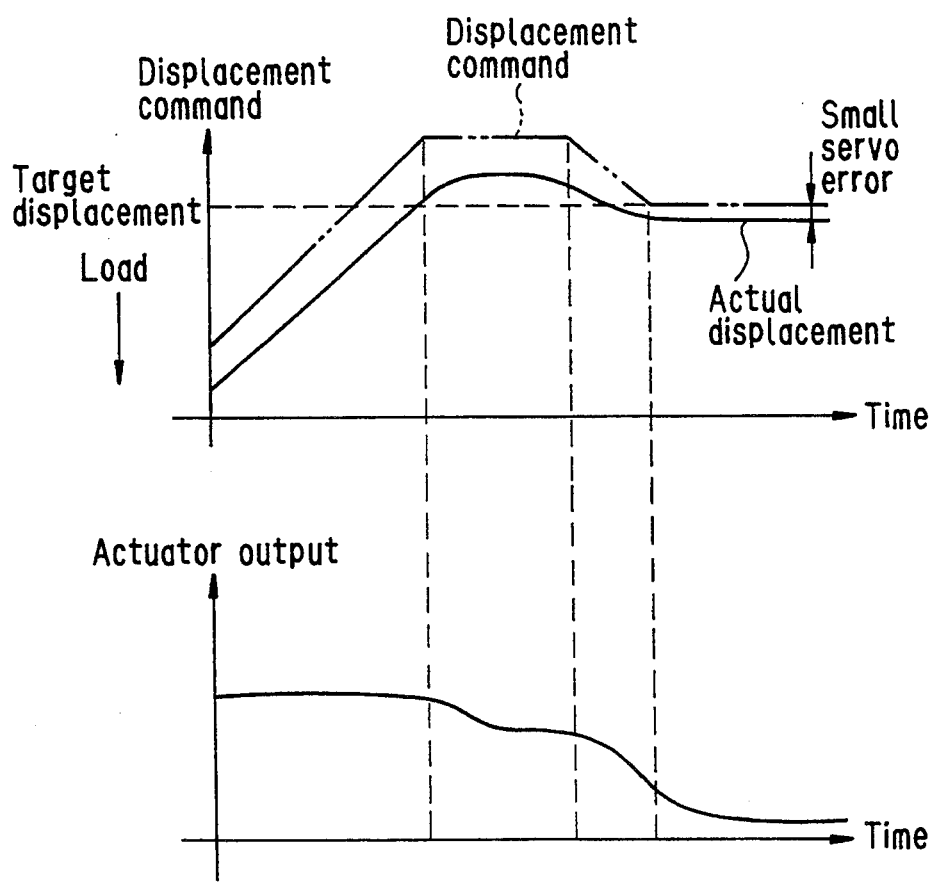
FIG. 5 are timing charts explaining the operation of the first embodiment of the invention in which a target displacement is in the direction opposite to that of the load.
Figure 6:
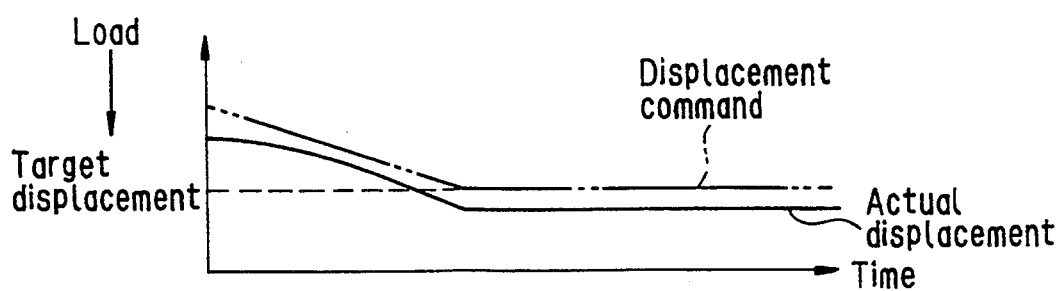
FIG. 6 is a timing chart, similar to FIG. 5, but in which a target displacement is in the same direction as that of the load.
Figure 7:
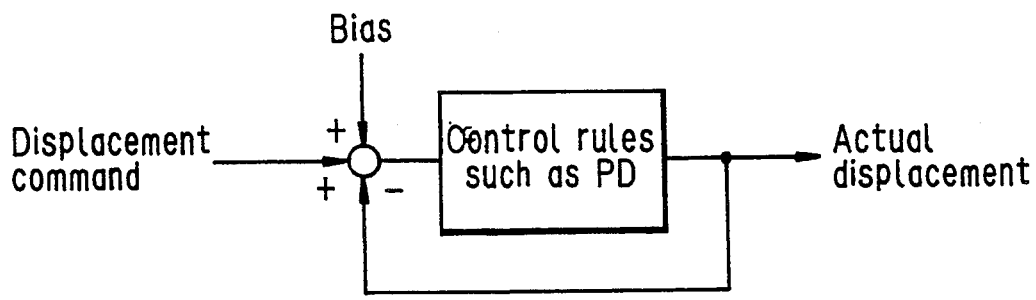
FIG. 7 is a block diagram showing a second embodiment of the invention.

In step S100 of this flow chart a discrimination is made as to whether or not the load is headed in the direction that reduces displacement. If the result is affirmative, control passes to step S102 in which a discrimination is made as to whether or not the current target displacement is larger than the target displacement up to now. If affirmative, i.e. if the target displacement is headed opposite to the load, control passes to step S104 in which the displacement command is temporarily made larger than the target displacement and then returned to the target displacement. In other words, the control is conducted as shown in the timing chart of FIG. 5. To be more specific, in light of the principle of virtual displacement (principle of virtual work), the directions of the weight loads on the actuators (motors) of the robot shown in FIG. 1 coincides with the direction in which the loads are directed when the height of the main unit 24 is lowered. When a given attitude is to be maintained, therefore, the drive control is conducted by first invoking displacement commands for an attitude higher than the target attitude to be held and then invoking displacement commands for the target attitude to be held. As a result of this, the friction in the actuators and the transmission system occurs in the direction opposite to the weight, spring forces and other static loads, In other words, since the frictional force works to hold the target displacement (position), it is possible, as shown in FIG. 5, to decrease the error between the displacement command and the actual displacement to near the hold limit. Specifically, since the actuator output is Actuator output = Error × Gain    (Eq. 5)

the output of the actuator, and accordingly its energy consumption, can be reduced by reducing either the error or the gain. When the result in step S102 is negative, i.e. when it is found that the target displacement has shifted in the direction of the load, control passes to step S106 in which drive control is conducted in the conventional way shown in FIG. 6. When the result in step S100 is negative, i.e. when it is found that the load is not headed in the direction that reduces the displacement, control passes through step S108 and the following steps, in which drive control is conducted in the opposite manner.

Owing to the foregoing configuration, this embodiment is able to reduce actuator output during holding of the target displacement and thus to lower actuator energy consumption. It is therefore possible to reduce the amount of energy consumed by the motors in the autonomous legged mobile robot of FIG. 1. Because of this, it is possible to operate the robot longer on the same battery or to reduce the size of the battery and thus realize a smaller and lighter robot. An energy saving is also realized.

A second embodiment of the invention is shown in FIGS. 7 to 10. As shown in the block diagram of FIG. 7, in the second embodiment a bias is added to the displacement command to obtain the same effect as in the first embodiment.

Figure 8:
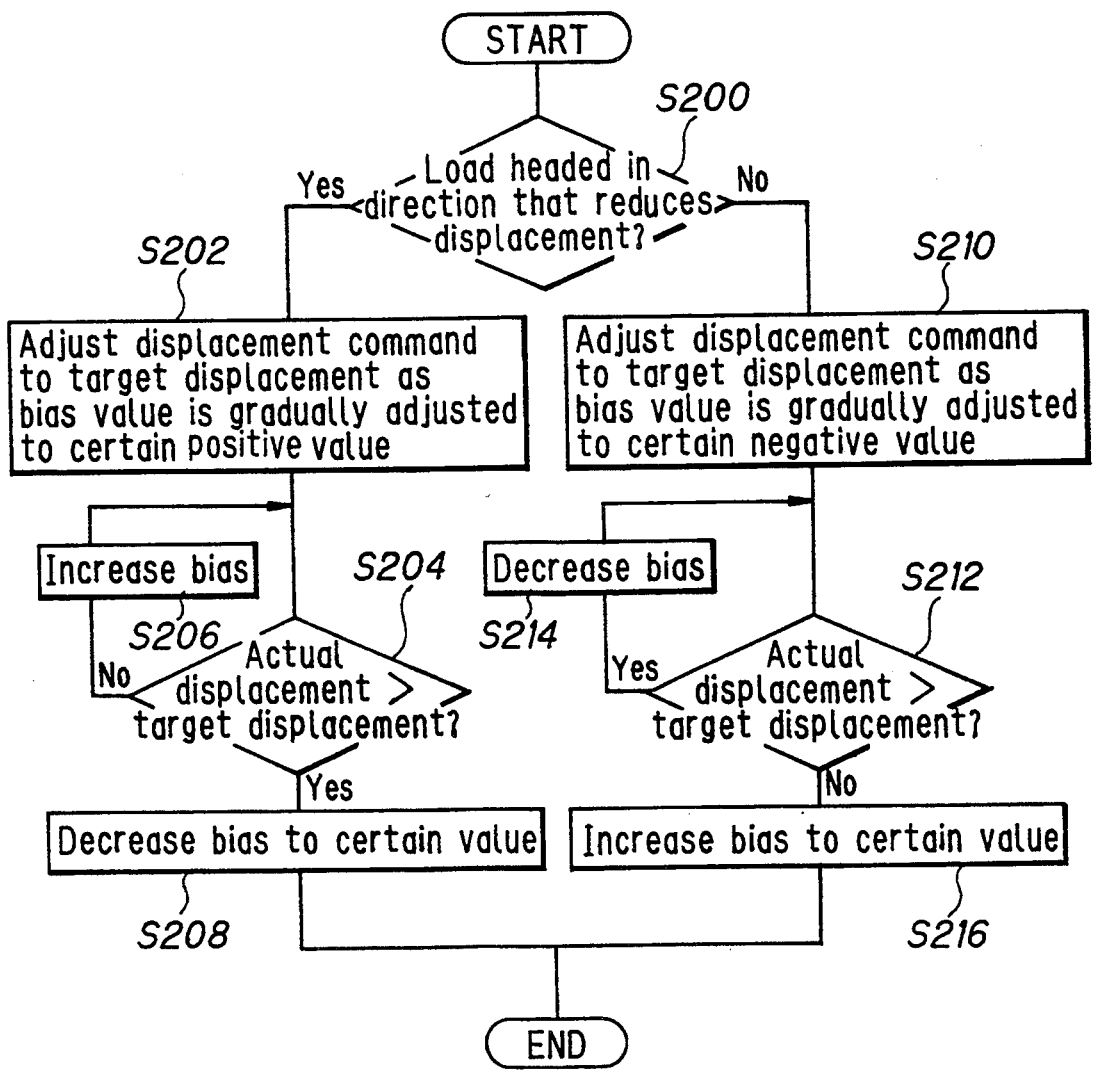
FIG. 8 is a flow chart showing the second embodiment of the invention.
Figure 9:
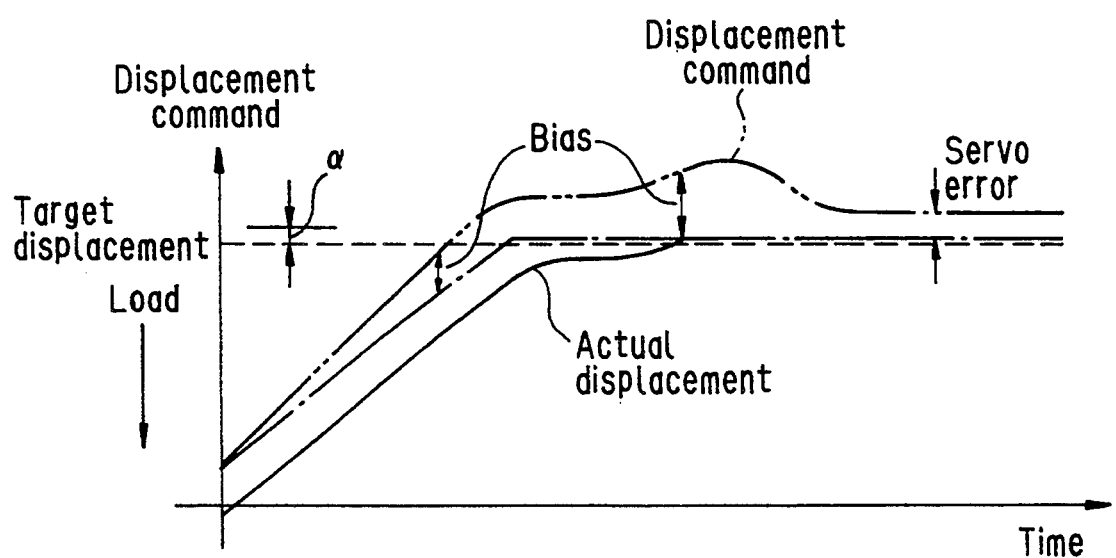
FIG. 9 is a timing chart explaining the operation of the second embodiment in which a target displacement is in the direction opposite to that of the of the load.

Namely in step S200 of the flow chart of FIG. 8 a discrimination is made as to whether or not the load is headed in the direction that reduces displacement. If the result is affirmative, control passes to step S202 in which, as shown in FIG. 9, the command displacement is adjusted to the target displacement as the bias value is gradually adjusted to a certain positive value. Control then passes to step S204 in which a discrimination is made as to whether or not the actual displacement has exceeded the target displacement and steps S204 and S206 are looped to increase the bias until the result of the discrimination becomes affirmative. When it is found in step S204 that the actual displacement has exceeded the target displacement, control passes to step S208 in which the bias is decreased to a certain value. The "certain value" here is set in advance to an appropriate one that can be considered the hold limit. If the result in step S200 is negative, on the other hand, control passes through step S210 and the following steps, in which control is conducted in the opposite manner, as shown in FIG. 10.

Thus in the second embodiment a bias added to the displacement command is first increased (decreased) until the actual displacement exceeds the target displacement, whereafter the bias is decreased (increased). Therefore, as in the first embodiment, the internal frictional force can be made act against the weight, spring forces and other static loads. As a result, the servo error shown in FIG. 5 can be reduced to the vicinity of the hold limit, making it possible to realize a reduction in actuator energy consumption similar to that according to the first embodiment.

Figure 10:
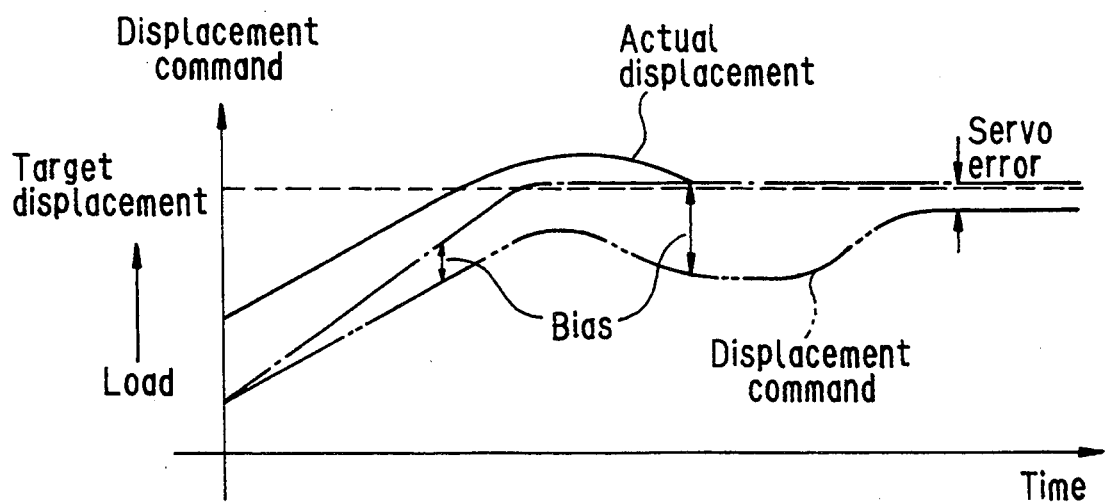
FIG. 10 is a timing chart, similar to FIG. 9, but a target displacement is in the same direction as that of the load.

It should be noted here that FIGS. 9 and 10 relate to examples in which the absolute value of the bias amount imparted in steps S202 and S210 are larger than the absolute value of the servo error. Moreover, in the interest of simplicity, the step for determining the direction of the target displacement of the first embodiment was omitted from the explanation of this embodiment and will also be omitted from those that follow.

Figure 11:
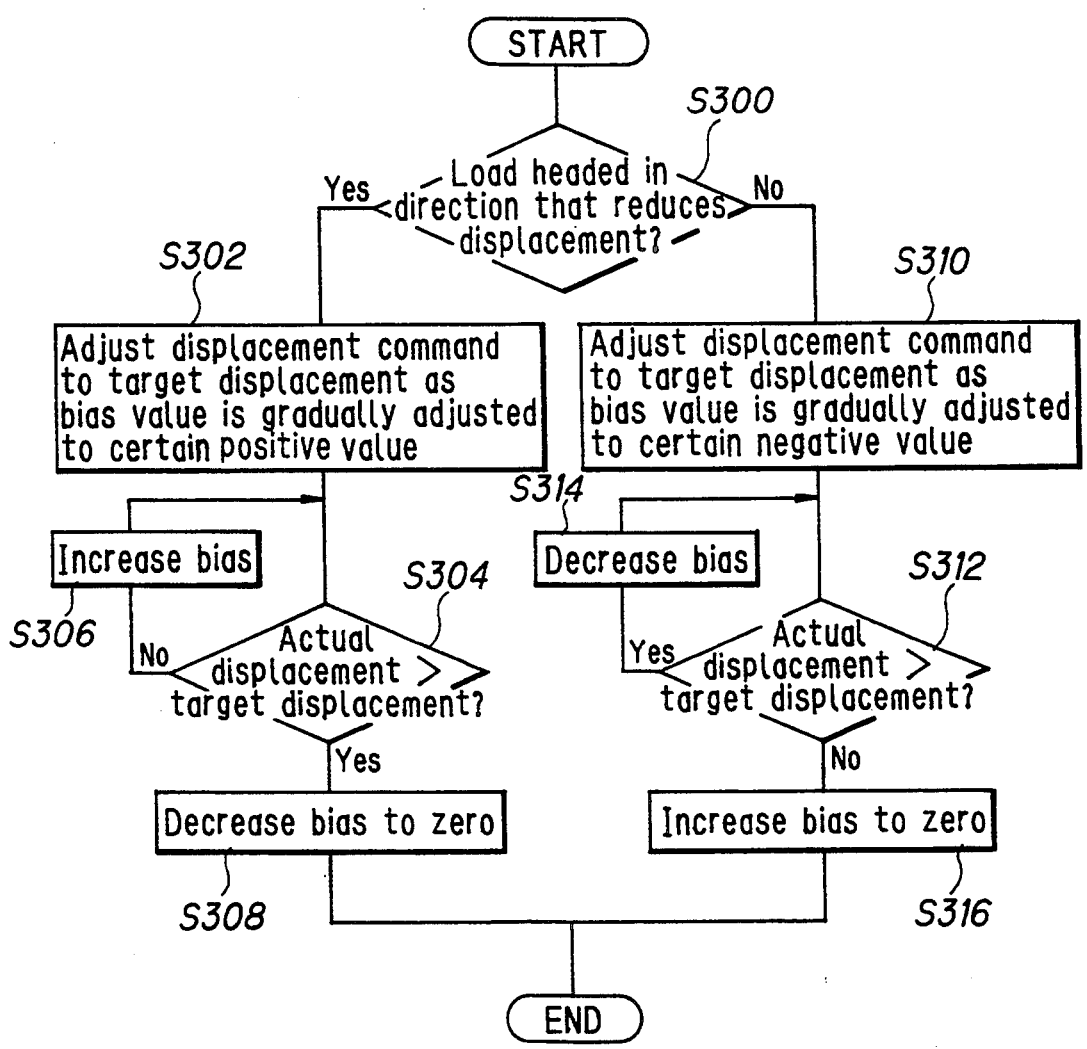
FIG. 11 is a flow chart showing a third embodiment of the invention.

A third embodiment of the invention is shown in FIG. 11, which is a flow chart similar that of the second embodiment in FIG. 8. This embodiment differs from the first and second embodiments only in the point that the bias is decreased (increased) to zero in step S308 (S316). The remaining steps and other parts of the configuration are the same as in the earlier embodiments. Since the bias is again used for once raising the displacement command value above the target displacement, it is possible to obtain an internal frictional force acting in the opposite direction from the weight and, as a result, possible to reduce the servo error to the vicinity of the hold limit and thus realize a reduction in actuator energy consumption.

Figure 12:
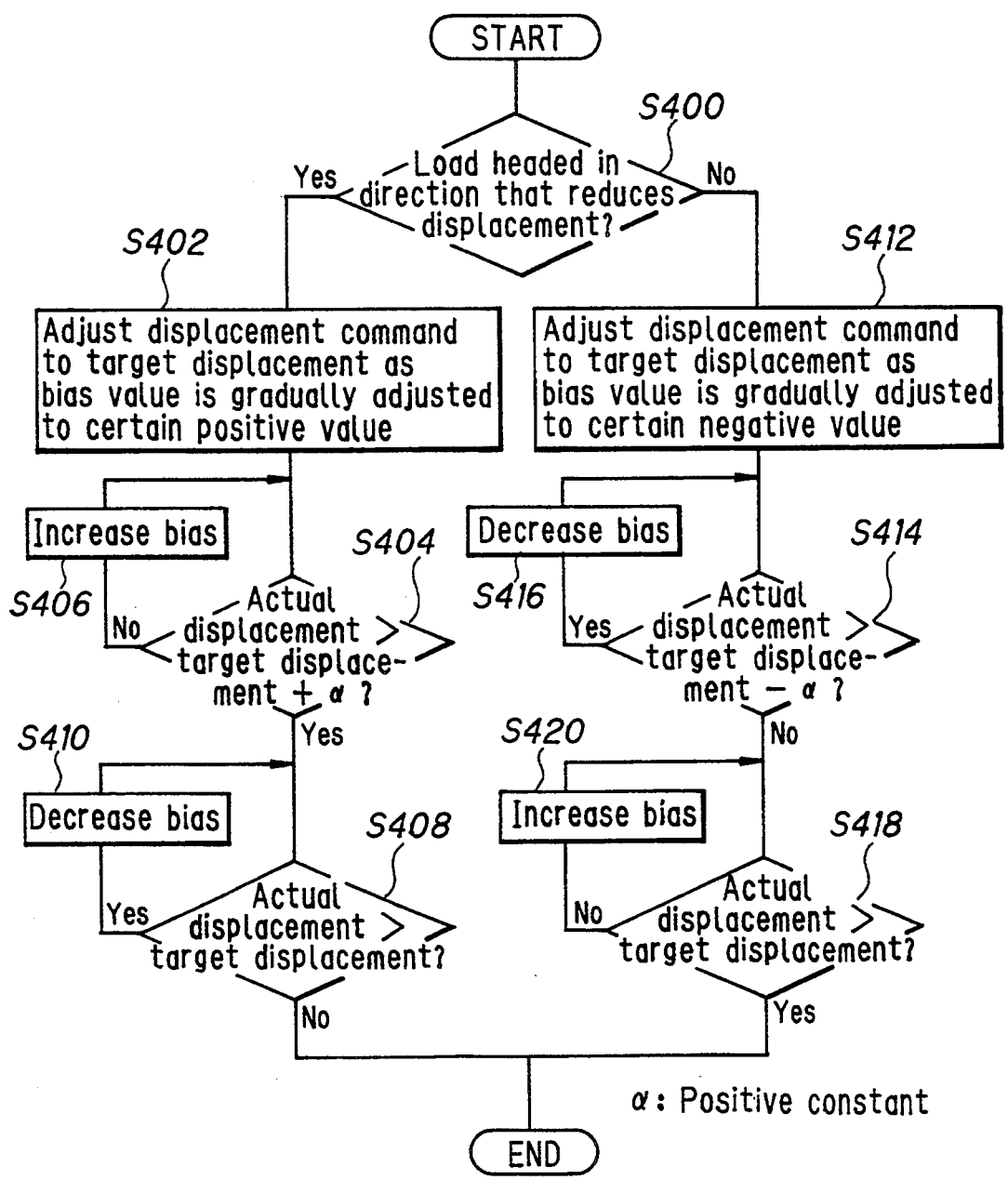
FIG. 12 is a flow chart showing a fourth embodiment of the invention.

A fourth embodiment of the invention is shown in FIG. 12, which is a flow chart similar that of the second embodiment in FIG. 8. This embodiment differs from the second and other earlier embodiments in the points that the bias is increased (decreased) during the actual displacement is at or below the value obtained by adding (subtracting) $\alpha$ (a positive constant; see FIG. 9) to (from) the target displacement (steps S404 and S406, S414 and S416) and that the bias is thereafter decreased (increased) if it is found that the actual displacement exceeds the target displacement (steps S408 and S410, S418 and S420). In other words, since the actual value always approaches the target displacement from a position shifted from the target displacement in the direction opposite to the load by the value of $\alpha$, it becomes possible to obtain from the frictional force a hold force corresponding to the kinetic frictional force. With the exception of the points that it has in common with the fifth embodiment described below, this embodiment is the same as the earlier embodiments in its remaining steps and other configurational elements, as well as in its effect.

Figure 13:
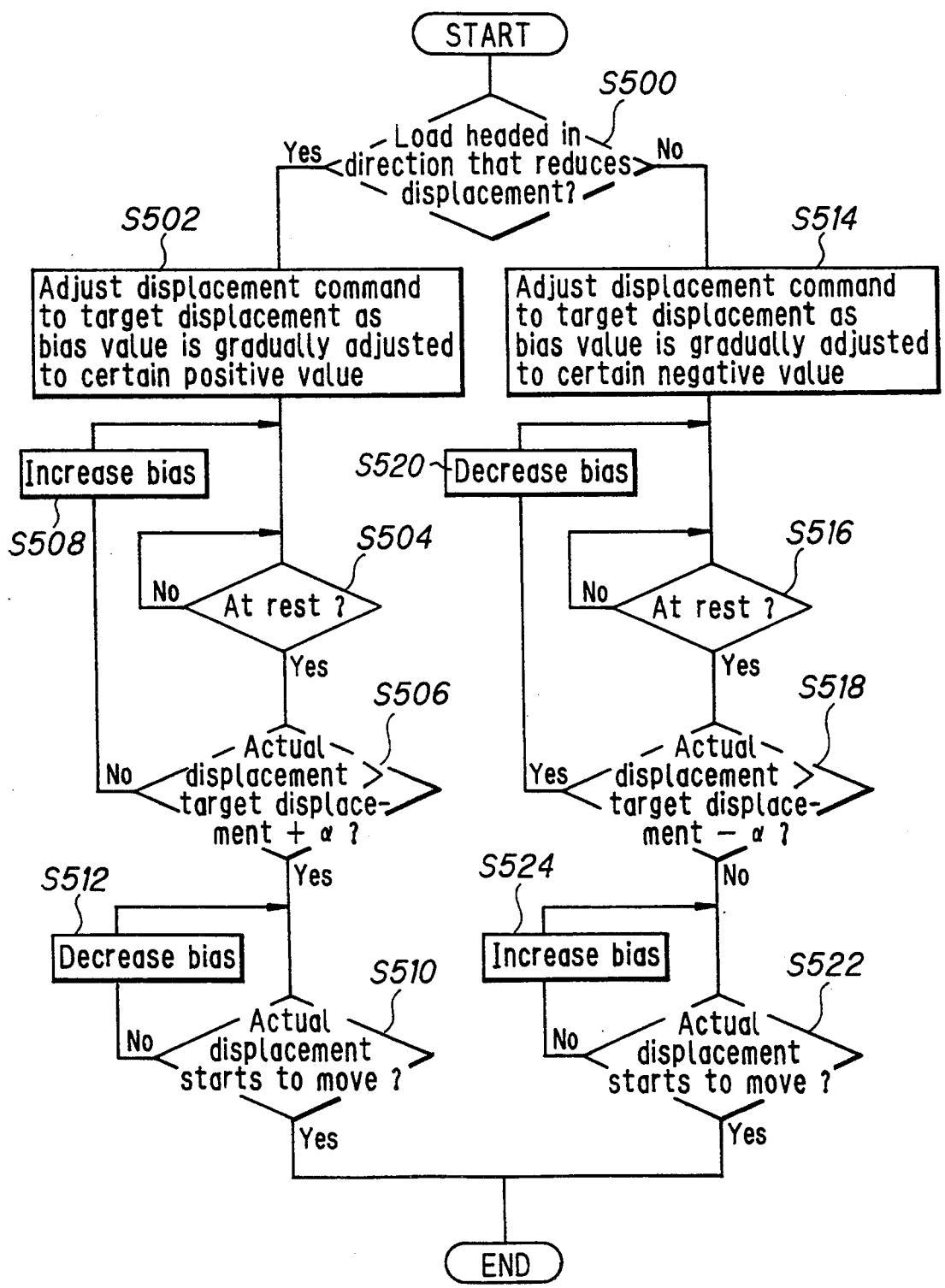
FIG. 13 is a flow chart showing a fifth embodiment of the invention.
Figure 14:
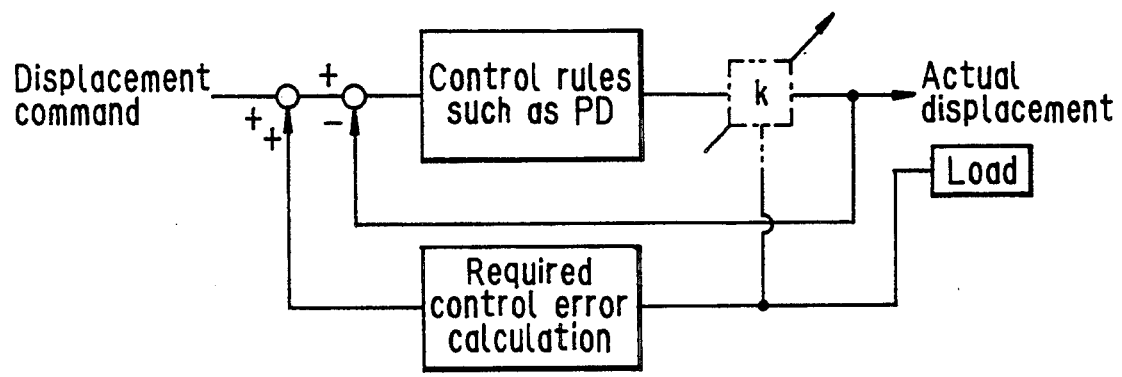
FIG. 14 is a block diagram showing the operation of a sixth embodiment of the invention.

A fifth embodiment of the invention is shown in FIG. 13, which is a flow chart similar that of the fourth embodiment in FIG. 12. This embodiment differs from the fourth and other earlier embodiments in the point that a discrimination is made regarding the actual hold state. Specifically, a discernment is made in step S504 (S516) as to whether or not the actual displacement is at rest, and if it the result is affirmative, control passes through steps S506 and S508 (S518 and S520) in which the bias is increased (decreased) until the actual displacement exceeds the target displacement plus (minus) $\alpha$, whereafter the bias is decreased (increased) in step S518 (S520) until it is discerned in step S510 (S522) that the actual displacement has begun to move. (The value of $\alpha$ is set with consideration to the amount of movement in steps S510 and S522. If the amount of movement is negligible, $\alpha$ can be zero.)

More specifically, in the first to third embodiments, the command value is once directed above the target value with respect to the direction of gravity so as to cause the internal frictional force to act in the direction opposite to the static load. As a result, the actuator output is reduced by reducing the error in Equation 5. If the actuator output is reduced too far, however, the hold limit will be exceeded and the actual displacement will begin to move. These earlier embodiments assume that the hold limit is set at an appropriate value in advance. In contrast, in the fifth embodiment (and the fourth embodiment), the hold limit is actually discriminated, namely it is deemed to be the point at which the actual displacement begins to move, and the bias is stopped to be decreased (increased). Once it has been stopped, the value at this time is held thereafter.

Therefore, in comparison with the first to third embodiments, the fifth (or fourth) embodiment reduces the actuator energy consumption with the actual displacement held more reliably in the vicinity of the target displacement. The remaining steps and other parts of the configuration are the same as in the earlier embodiments.

Figure 15:
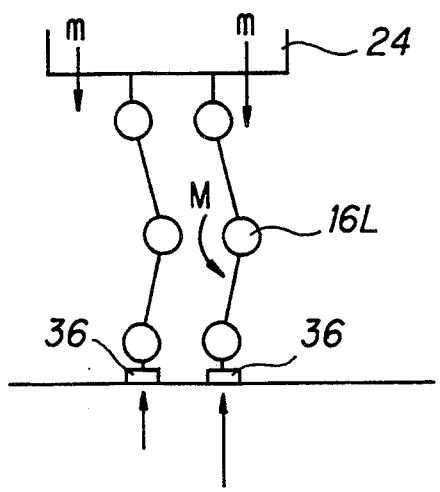
FIG. 15 is a view explaining load detection referred to in the block diagram of FIG. 14.
Figure 16:
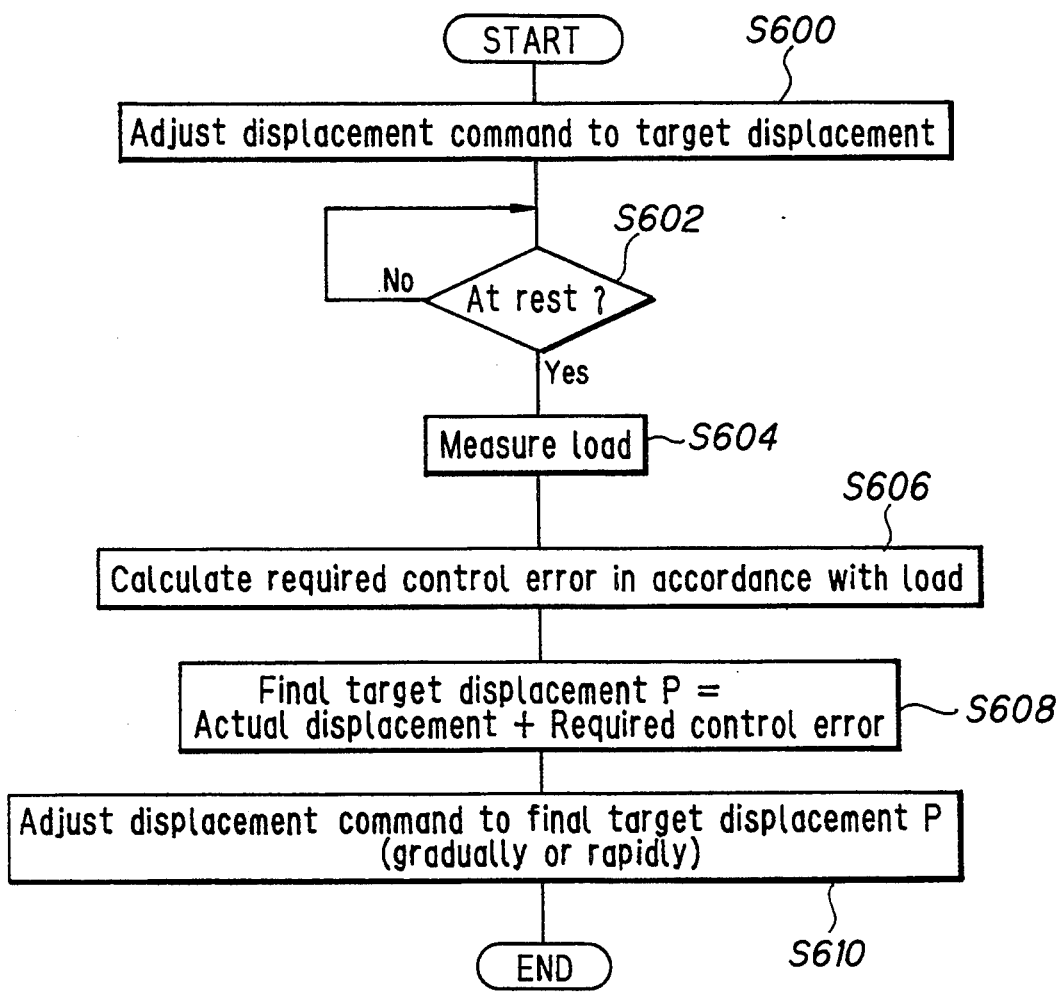
FIG. 16 is a flow chart showing the operation of the sixth embodiment illustrated in the block diagram of FIG. 14.
Figure 17:
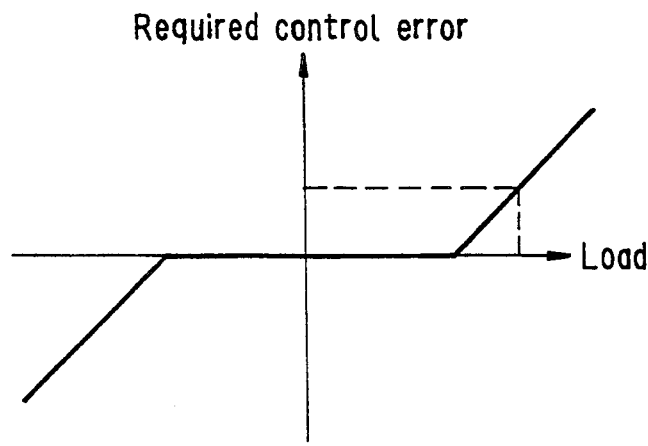
FIG. 17 is a graph explaining the characteristics illustrating required control error referred to in the flow chart of FIG. 16.

FIGS. 14 to 17 show a sixth embodiment of the invention. While like the fifth embodiment the sixth embodiment also discriminates the hold limit and determines the control value accordingly, as shown in the block diagram of FIG. 14 it discriminates the hold limit by detecting the external static load, thus enabling the hold limit to be estimated more directly. As shown in FIG. 15, the load is detected by the six-dimensional force and torque sensor 36. For example, if, as illustrated in FIG. 15, the mass m of the left leg side becomes larger than that of the right leg side, a large moment M acts on the knee joint 16L, for instance. A larger hold force is therefore necessary for holding the target displacement. The sixth embodiment is therefore configured to adjust the amount of decrease in the error (Equation 5) according to the detected load. This will be explained with reference to the flow chart of FIG. 16. First, in step S600, the displacement command is adjusted to the target displacement value. Control then passes to step S602 in which the control waits for the actual displacement to come to rest. When it is found to have stopped, control passes to step S604 in which the static load from the exterior is measured and to step S606 in which the required control error, more specifically the minimum servo error exhibited by the hold limitation, is calculated in accordance with the characteristic curve of FIG. 17. Control then passes to step S608 in which the final target displacement P is calculated by adding together the calculated required control error and the actual displacement placement and to step S610 in which the displacement command is gradually (or rapidly) adjusted to the final target displacement P. Since after step S610 has been executed the actual servo error continues to be the minimum servo error obtained in step S606, the internal frictional force is used to hold the actual displacement almost at the hold limit.

Owing to the fact that the sixth embodiment determines the control value on the basis of the hold limit estimated from the load, it is able to reduce actuator output with the target displacement held even more reliably than in the case of the earlier embodiments, particularly the fifth embodiment. In addition, while the operating principle of the fourth and fifth embodiments allows them to utilize hold force only up to the kinetic frictional force, the sixth embodiment can utilize hold force up to near the static friction limit. The remaining steps and other parts of the configuration are the same as in the earlier embodiments.

Figure 18:
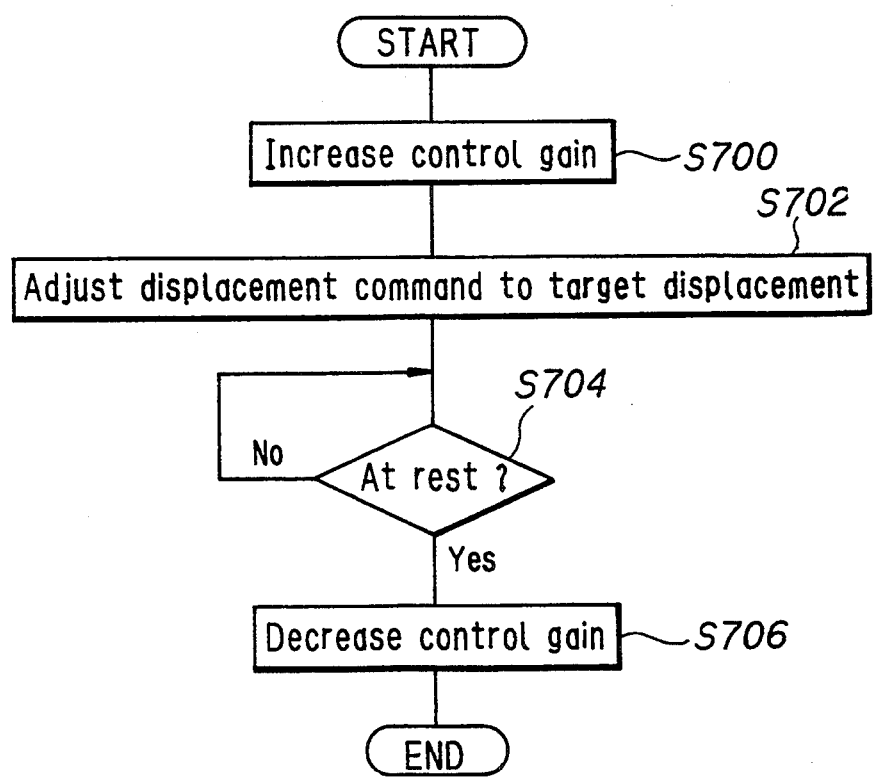
FIG. 18 is a flow chart showing a seventh embodiment of the invention.
Figure 19:
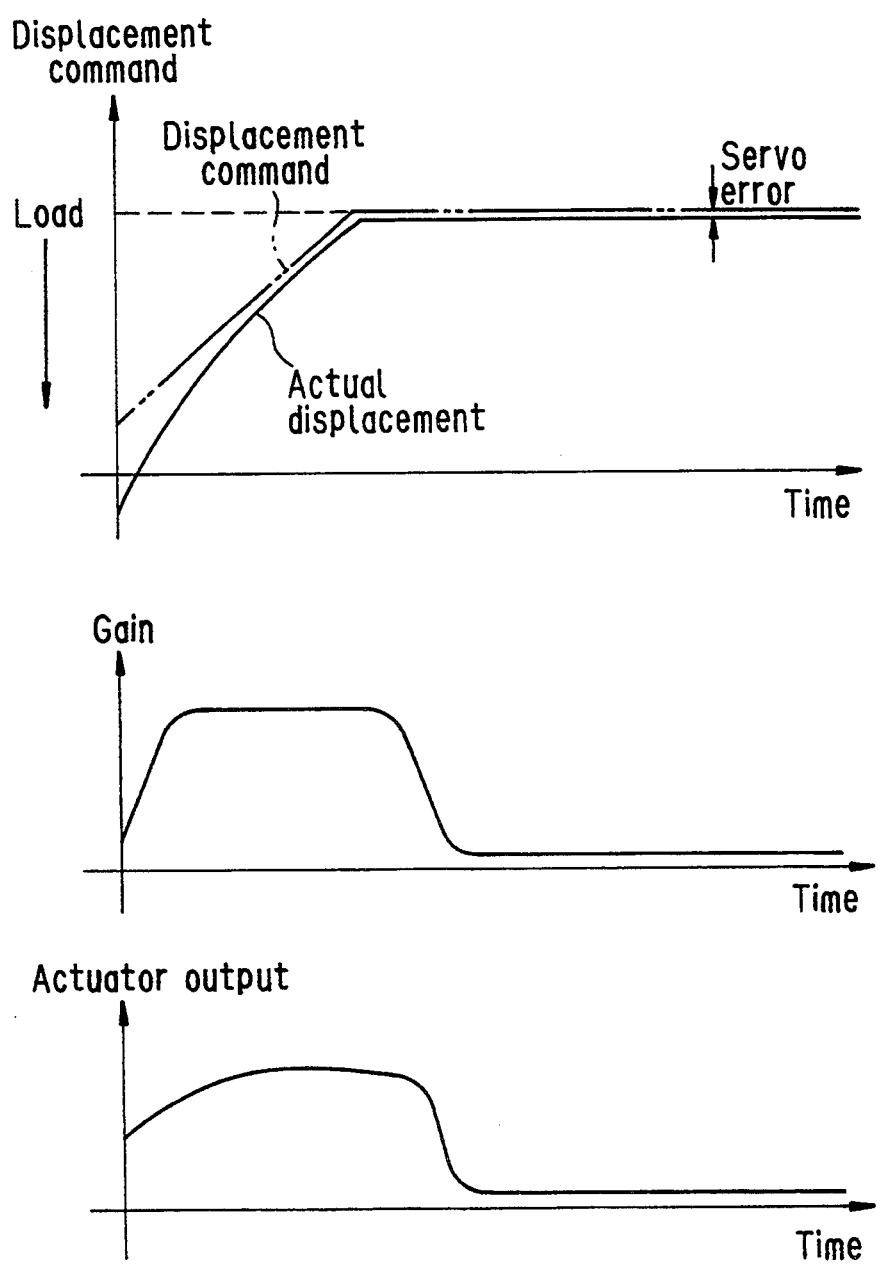
FIG. 19 are timing charts explaining the operation of the seventh embodiment of the invention.

FIGS. 18 and 19 show a seventh embodiment of the invention. In contrast to the earlier embodiments which reduce the actuator output by decreasing the error in Equation 5, the seventh embodiment reduces the actuator output by decreasing the control gain k, as indicated in phantom lines in the block diagram of FIG. 14. In steps S700 and S702 of the flow chart of FIG. 18, the control gain is raised as shown in the timing chart of FIG. 19 so as to adjust the displacement command to the target displacement. Control then passes to step S704 where it waits for the actual displacement to come to rest. When it is found to have stopped, control passes to step S706 in which the control gain is decreased.

Since the seventh embodiment first raises the control gain and then decreases it, it also causes the internal frictional force to operate in the direction opposite to the direction that the static load operates, thereby reducing the actuator output. Since the control gain in Equation 5 is reduced, the final result is that the actuator output becomes smaller and actuator energy consumption is reduced.

Figure 20:
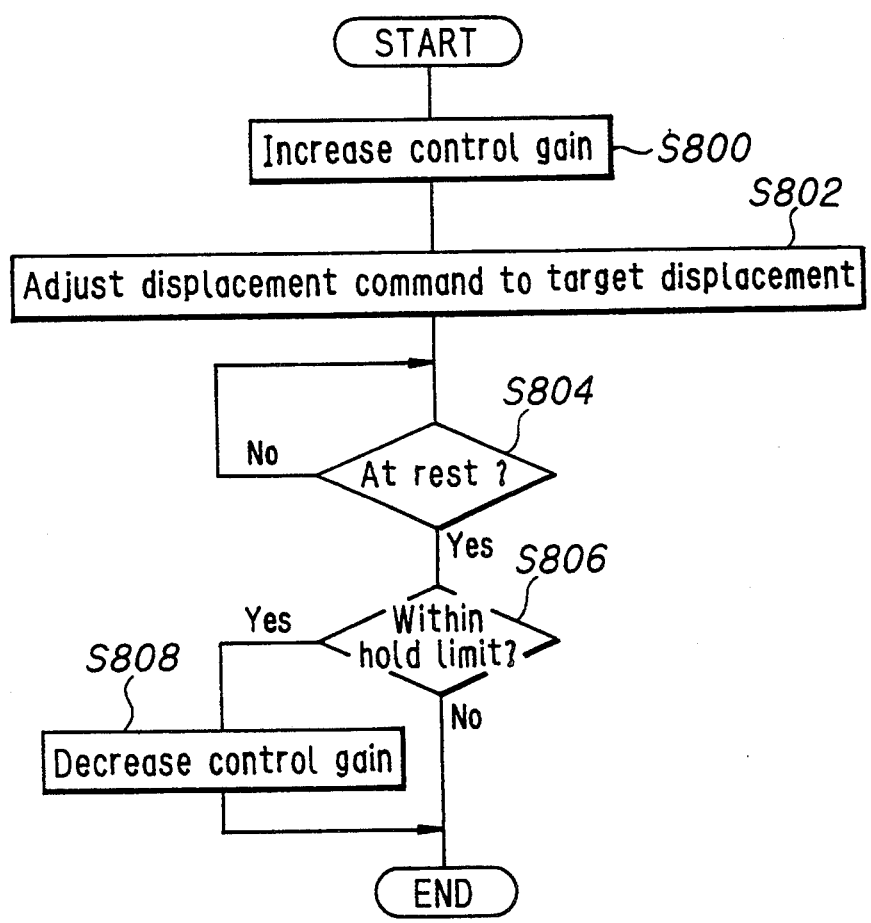
FIG. 20 is a flow chart showing an eighth embodiment of the invention.
Figure 21:
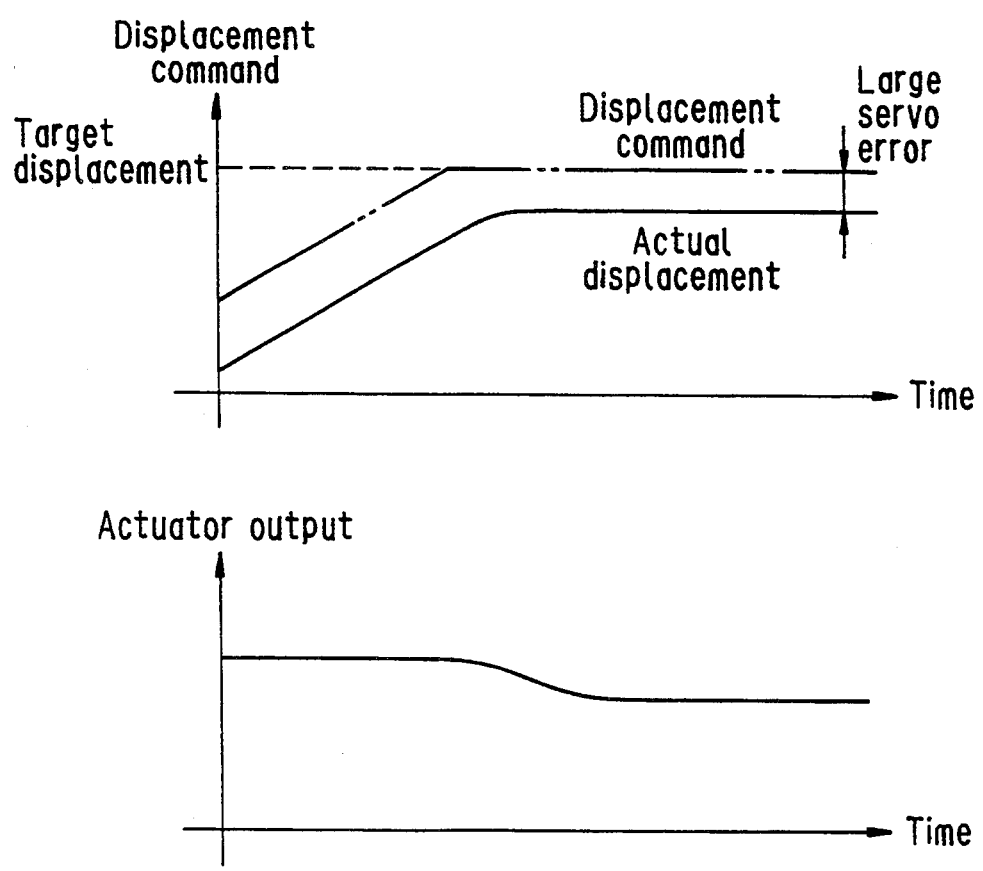
FIG. 21 is shows timing charts illustrating a conventional PD positional control.

An eighth embodiment of the invention is shown in FIG. 20, which is a flow chart similar that of the seventh embodiment in FIG. 18. This embodiment differs from the seventh the point that it includes a step S806 for discriminating whether or not the hold limit has been reached, and if it has, the lowering of the control gain is discontinued. The hold limit can be discriminated by finding where the actual displacement begins to move as in the first embodiment, or, as in the sixth embodiment, by detecting the static load from the exterior. The remaining steps and other parts of the configuration are the same as the seventh embodiment. Aside from the point that the actual displacement can be more reliably held in the vicinity of the target value, the effect is the same as that of the seventh embodiment.

In addition to the embodiments described in the foregoing, the invention can also be realized in various other modifications. The control can be summarized as follows:
1. Hold limit
   a. Not to discriminate
   b. To discriminate by detecting the point at which the actual displacement can no longer be held and begins to move
   c. To discriminate by detecting load
2. Operation
   a. To reduce error
   b. To reduce gain
3. Control loop
   a. Open loop
   b. Closed loop In view of the principle involved, it is possible to use all combinations of 1, 2 and 3. The embodiments described in the foregoing are only a few examples.

Although two ways of using processing to manipulate the error were explained, namely by manipulating the displacement command itself and by manipulating the amount of bias added to the error command, there is no substantial difference between them.

In addition, although the explanation was made with respect to a legged mobile robot employing biped locomotion, the invention can be applied not only to such a robot but also to any other actuator involving friction.

Moreover, the present invention has thus been shown and described with reference to the specific embodiments. However, it should be noted that the present invention is in no way limited to the details of the described arrangements, changes and modifications may be made without departing from the scope of the appended claims.

What is claimed is:

1. A method for driving an actuator having internal friction to displace a mechanism to a target value and hold it there against a load supported at least in part by the mechanism, comprising the steps of:
   (a) determining an initial displacement command value;
   (b) adding a value to the initial displacement command value to determine a second displacement command value and then driving the actuator by the second displacement command value in the direction opposite to the load; and
   (c) returning the second displacement command value to the initial displacement command value and driving the actuator by the initial displacement command value, to hold the actuator against load.

2. A method according to claim 1 further comprising the step of:
   determining a target displacement for the mechanism; and
   displacing the mechanism above the target displacement with respect to the direction of gravity so as to cause internal friction to act in the direct opposite to the load.

3. A method for driving an actuator having internal friction to displace a mechanism to a target value and hold it there against a load, comprising the steps of:
   determining an initial displacement command value;
   adding a bias to the initial displacement command value to determine the second displacement command value and driving the actuator by the second displacement command value such that an actual displacement is beyond the target displacement in the direction opposite to the load; and
   changing the second displacement command value in the direction in which an absolute value of a control error or gain decreases so as to return it to the initial displacement command value.

4. A method according to claim 1, wherein:
   the second displacement command value is changed in the direction in which an absolute value of a control gain decreases so as to return it to the initial displacement command value until the actual displacement coincides with the target displacement.

5. A method for driving an actuator having internal friction to displace a mechanism to a target value and hold it there against load, comprising the steps of:
   (a) determining a displacement command value of the actuator for reaching a target displacement and driving the actuator by the displacement command value toward the target displacement;
   (b) changing the displacement command value in the direction in which an absolute value of a control error decreases to determine a second displacement command value and driving the actuator by the second displacement command value until the mechanism begins to move after it has come to rest.

6. A method for driving an actuator having internal friction to displace a mechanism to a target value and hold it there against load; comprising the steps of:
   (a) determining an initial displacement command value of the actuator and driving the actuator by the initial displacement command value towards the target displacement until it comes to rest; and
   (b) changing the initial displacement command value towards a second displacement command value determined by adding to the actual displacement a value indicative of a limit at which the target displacement is able to be held, to hold the actuator against load.

7. A method according to claim 6, wherein at the step (b):
   the value indicative of the limit at which the target displacement is able to be held is determined by detecting the load.

8. A method for driving an actuator having internal friction to displace a mechanism to a target value and hold it there against load, comprising the steps of:
   (a) determining a displacement command of the actuator and a gain to be multiplied thereto and driving the actuator by the command value with the determined gain;
   (b) increasing the gain until actual displacement stops; and
   (c) decreasing the gain thereafter, to hold the actuator against the load.

9. A method according to claim 8, further including the steps of:
   (d) determining a limit at which the target displacement is able to be held;
   wherein at the step (c):
   decreasing the gain towards the limit after the actual displacement has stopped.

10. A method for driving a joint actuator of a legged mobile robot to displace the joint to a target position and hold it there against a static load including gravitation, comprising the steps of:
    (a) determining an initial command value of the joint actuator to displace the joint to the target position;
    (b) determining a second command value on the basis of the initial command value and driving the joint actuator by the second command value to once displace the joint above the target position with respect to the direction of gravity; and
    (c) determining a third command value on the basis of the initial command value and driving the joint actuator to displace the joint towards the target position, to hold it there against the static load.

11. A method according to claim 10, wherein at the step (b):
    the second command value is determined such that the legged mobile robot once takes an attitude higher than that determined by the initial command value with respect to the direction of gravity.

12. A method of controlling movement of a biped walking robot having actuators for moving limbs of the robot, comprising the steps of:
    retrieving walking pattern data defined in advance in terms of joint trajectories from a memory;
    outputting the walking pattern data to a processor;
    determining an initial displacement command value for an actuator of the robot;
    adding a value to the initial displacement command value to determine a second displacement command value;
    determining the direction of a non-frictional load associated with the actuator;
    driving the actuator with the second displacement command value, in a direction opposite to the direction of the load; and
    returning the second displacement command value to the initial displacement command value and driving the actuator by the initial displacement command value, thereby causing frictional forces to act in a direction opposite to the direction of the load, such that actuator energy consumption may be reduced.

* * * * *